United States Patent
Tsunoda

(10) Patent No.: US 11,124,042 B2
(45) Date of Patent: Sep. 21, 2021

(54) VEHICLE HEATING DEVICE

(71) Applicant: SUBARU CORPORATION, Tokyo (JP)

(72) Inventor: Takashi Tsunoda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 209 days.

(21) Appl. No.: 16/015,746

(22) Filed: Jun. 22, 2018

(65) Prior Publication Data
US 2019/0092119 A1 Mar. 28, 2019

(30) Foreign Application Priority Data

Sep. 28, 2017 (JP) .............................. JP2017-187708

(51) Int. Cl.
| | | |
|---|---|---|
| *B60H 1/00* | (2006.01) | |
| *B60H 1/22* | (2006.01) | |
| *B60N 2/90* | (2018.01) | |
| *B60N 2/56* | (2006.01) | |
| *B60H 1/14* | (2006.01) | |

(52) U.S. Cl.
CPC ..... *B60H 1/00285* (2013.01); *B60H 1/00392* (2013.01); *B60H 1/00492* (2013.01); *B60H 1/143* (2013.01); *B60H 1/2218* (2013.01); *B60N 2/56* (2013.01); *B60N 2/995* (2018.02); *B60H 1/00742* (2013.01); *B60H 2001/224* (2013.01); *B60H 2001/2253* (2013.01); *B60H 2001/2262* (2013.01); *B60H 2001/2287* (2013.01)

(58) Field of Classification Search
USPC ............................................................ 237/5
See application file for complete search history.

(56) References Cited

U.S. PATENT DOCUMENTS

| | | | |
|---|---|---|---|
| 3,870,855 A | 3/1975 | Edlund et al. | |
| 3,885,126 A | 5/1975 | Sugiyama et al. | |
| (Continued) | | | |

FOREIGN PATENT DOCUMENTS

| | | |
|---|---|---|
| JP | 49-40953 U | 7/1972 |
| JP | 60-23407 U | 2/1985 |
| (Continued) | | |

OTHER PUBLICATIONS

Notification of reason(s) for refusal issued in corresponding Japanese Patent Application No. 2017-187708 dated Apr. 16, 2019.

*Primary Examiner* — Kenneth J Hansen
*Assistant Examiner* — John E Bargero
(74) *Attorney, Agent, or Firm* — Troutman Pepper Hamilton Sanders LLP

(57) ABSTRACT

A vehicle heating device includes a heat storage material, a heat recovery unit, a footrest, and a heat controller. The vehicle heating device heats an occupant with heat stored in the heat storage material. The heat recovery unit recovers thermal energy from at least one of a heat source generated by a vehicle or a natural heat source from outside of the vehicle. The heat storage material stores the recovered thermal energy. The footrest is provided at a front portion of a vehicle seat disposed in a vehicle cabin, and has the heat storage material packed inside a heat insulating material. The heat controller heats the footrest by radiating the heat stored in the heat storage material at a predetermined timing with respect to the occupant to be on the vehicle.

19 Claims, 4 Drawing Sheets

(56) References Cited

U.S. PATENT DOCUMENTS

| | | | | |
|---|---|---|---|---|
| 5,012,070 A | * | 4/1991 | Reed | B60H 1/00314 |
| | | | | 219/202 |
| 2005/0184565 A1 | * | 8/2005 | Weiss | B60N 2/5635 |
| | | | | 297/180.15 |
| 2007/0035162 A1 | * | 2/2007 | Bier | B60H 1/00285 |
| | | | | 297/180.15 |
| 2010/0107635 A1 | | 5/2010 | Tsubone | |
| 2016/0347149 A1 | * | 12/2016 | Rustoni | B60H 1/00771 |
| 2017/0036514 A1 | | 2/2017 | Umehara et al. | |
| 2018/0162243 A1 | * | 6/2018 | Akaike | B60N 2/75 |

FOREIGN PATENT DOCUMENTS

| | | | |
|---|---|---|---|
| JP | 2002-0291581 | * | 10/2002 |
| JP | 2002-291581 A | | 10/2002 |
| JP | 2008-215708 A | | 9/2008 |
| JP | 2010-221968 A | | 10/2010 |
| JP | 2015-209029 A | | 11/2015 |

\* cited by examiner

VEHICLE HEATING DEVICE

CROSS-REFERENCE TO RELATED APPLICATIONS

The present application claims priority from Japanese Patent Application No. 2017-187708 filed on Sep. 28, 2017, the entire contents of which are hereby incorporated by reference.

BACKGROUND

1. Technical Field

The present invention relates to a vehicle heating device that heats a footrest provided at a front portion of a vehicle seat by heat accumulated from a heat source generated by the behavior of the vehicle.

2. Related Art

In related arts of a vehicle, such as represented by an automobile, indoor heating is mainly performed by using combustion heat of an engine or the like as a heat source, but in the future, the number of so-called electric vehicles that do not rely on combustion engines will increase. Since there is no heat generating source in an electric vehicle that generates a large amount of heat like a combustion engine, it is necessary to secure a heat source for indoor heating by an electrical heat generator such as a heat-pump air conditioner or a heater.

However, since heat-pump air conditioners or electric heat generators are driven by electric power, electric power consumption of a vehicle-mounted battery increases, as electrical energy is drawn from the vehicle-mounted battery, and shortens the driving distance of the vehicle, which turns out a serious problem particularly in cold areas.

Therefore, in Japanese Unexamined Patent Application Publication (JP-A) No. 2010-221968, the present applicant proposed a technique that extends driving distance by suppressing battery consumption during driving by preheating a vehicle cabin before an occupant gets on board with electric power supplied from an external power supply.

SUMMARY OF THE INVENTION

An aspect of the present invention provides a vehicle heating device. The vehicle heating device includes a heat storage material, a heat recovery unit, a footrest, and a heat controller. The vehicle heating device is configured to heat an occupant with heat stored in the heat storage material. The heat recovery unit is configured to recover thermal energy from at least one of a heat source generated by a behavior of a vehicle or a natural heat source from outside of the vehicle. The heat storage material is configured to store the thermal energy recovered by the heat recovery unit. The footrest is configured to be provided at a front portion of a vehicle seat disposed in a vehicle cabin. The footrest has the heat storage material packed inside a heat insulating material. The heat controller is configured to heat the footrest by radiating the heat stored in the heat storage material at a predetermined timing with respect to the occupant to be on the vehicle.

An aspect of the present invention provides a vehicle heating device. The vehicle heating device includes a heat storage material, a heat recovery unit, a footrest, and circuitry. The vehicle heating device is configured to heat an occupant with heat stored in the heat storage material. The heat recovery unit is configured to recover thermal energy from at least one of a heat source generated by a behavior of a vehicle or a natural heat source from outside of the vehicle. The heat storage material is configured to store the thermal energy recovered by the heat recovery unit. The footrest is configured to be provided at a front portion of a vehicle seat disposed in a vehicle cabin. The footrest has the heat storage material packed inside a heat insulating material. The circuitry is configured to heat the footrest by radiating the heat stored in the heat storage material at a predetermined timing with respect to the occupant to be on the vehicle.

DETAILED DESCRIPTION

Figure 1:
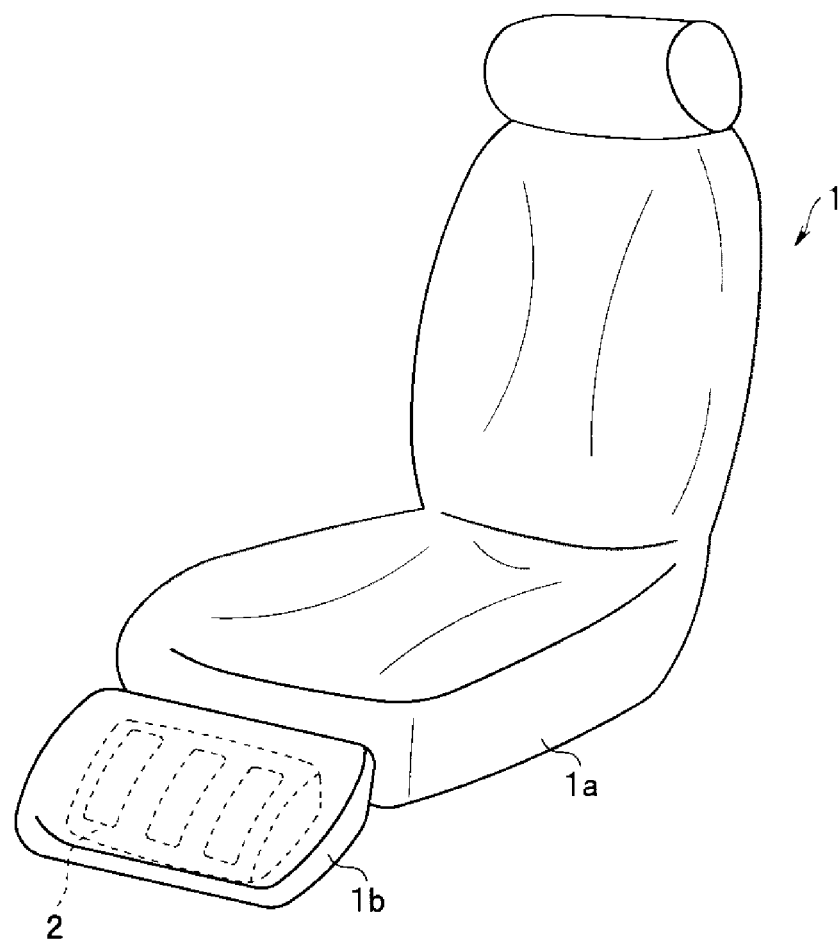
FIG. 1 illustrates a perspective view illustrating a vehicle seat having an Ottoman at the front thereof.

Hereinafter, an example of the present invention will be described with reference to the drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

The technique disclosed in JP-A) No. 2010-221968 cannot be applied to a case in which a vehicle is parked in an environment where equipment for supplying external power is not provided. Further, when preheating is performed each time by an external power supply, excessive increases in electricity costs is disadvantageous.

It is desirable to provide a vehicle heating device that can heat with a small amount of electric power without using an external power supply, suppress excessive increases in electricity costs, and enable an occupant to quickly feel warmth with a small amount of electric power even in a cold environment.

A vehicle seat 1 illustrated in FIG. 1 is, for instance, a driver seat provided on a driver's side of an electric vehicle. An Ottoman 1b, as a footrest, is disposed at a front portion of a seat cushion 1a of the vehicle seat 1. A heat storage unit 2 is housed in the Ottoman 1b.

When the electric vehicle is a self-driving vehicle and it is not necessary to accelerate or apply brakes with a foot pedal, a driver can ride in a relaxed state. As a result, it is possible for the driver to run the electric vehicle in a state in which a lower leg (including the ankle) is placed on the Ottoman 1b immediately after getting on board. The vehicle seat 1 is not limited to the driver's side and may be a passenger seat provided on a passenger's side or a rear seat provided in the rear.

Figure 2:
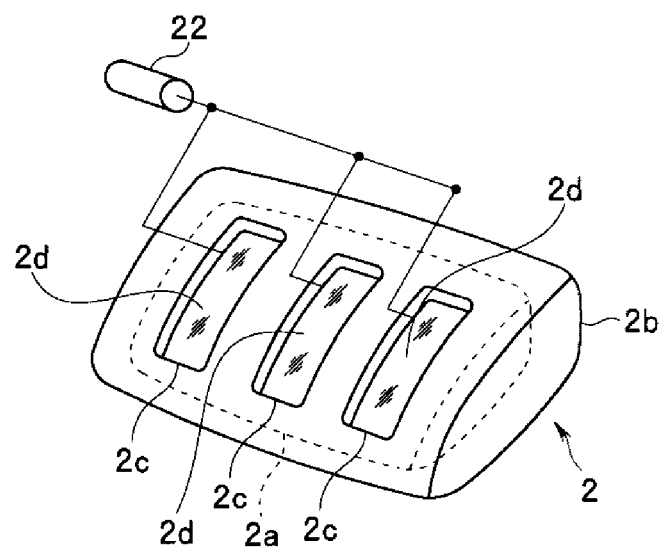
FIG. 2 illustrates a perspective view illustrating a heat storage unit housed in an Ottoman.

As shown in FIG. 2, the heat storage unit 2 has a heat storage container 2a which is filled with a known heat storage material 2e (see FIG. 3) such as paraffin, and the outer periphery of the heat storage container 2a is enclosed by a heat insulating material 2b such as urethane foam. A heat radiation window 2c is a heat transfer area opened to an upper surface of the heat insulating material 2b, that is, the top of the Ottoman 1b on which a lower leg of a seated person rests. A heat shutter 2d, which is a heat transfer opening and closing unit made of a low thermal conductivity material such as resin, is slidably disposed in the heat radiation window 2c, and the heat shutter 2d is connected to a shutter actuator 22 composed of an electromagnetic solenoid or the like. The heat shutter 2d is openable and closable by an ON/OFF operation of the shutter actuator 22. The shutter actuator 22 is turned ON/OFF in accordance with a drive signal from a controller 11a to be described later.

Figure 3:
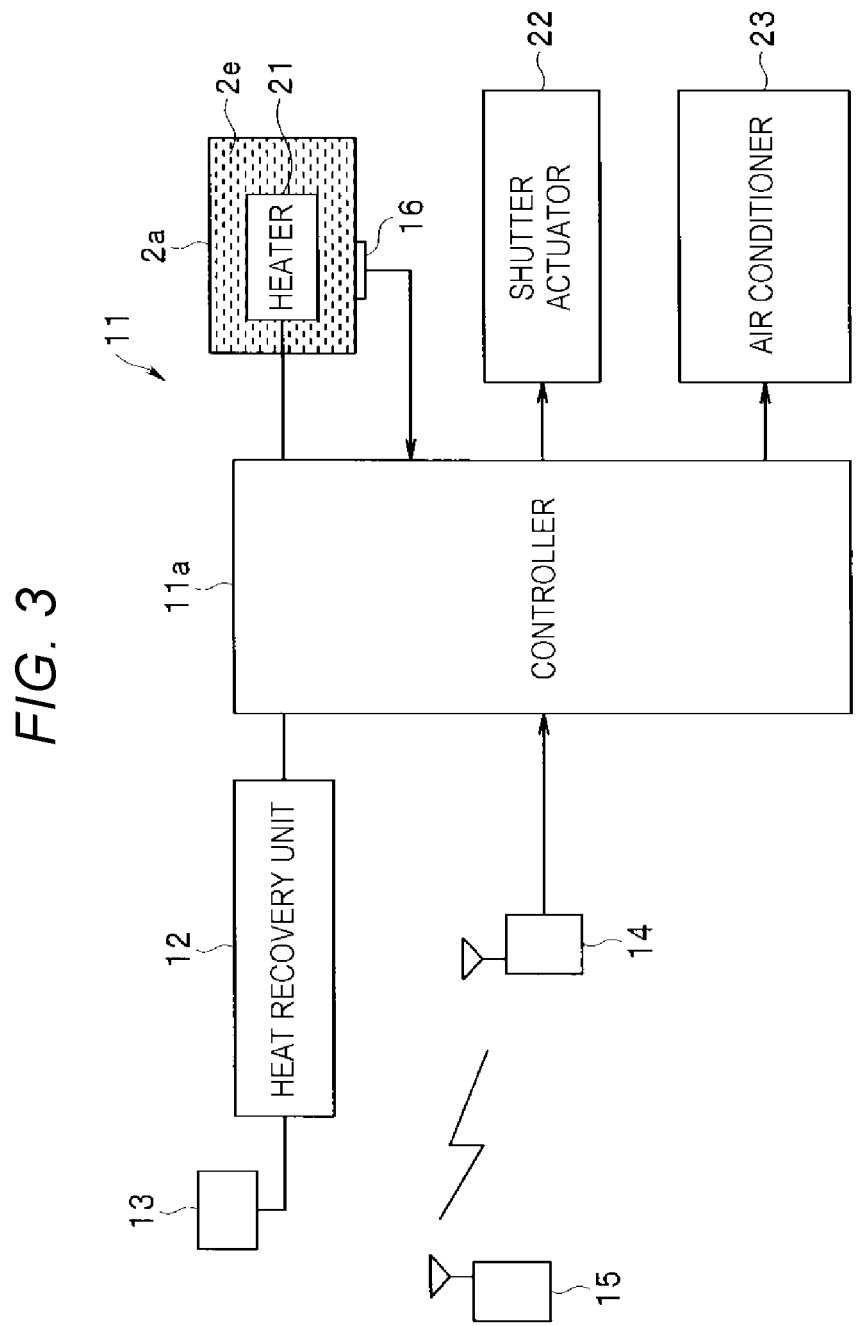
FIG. 3 is a schematic block diagram showing a heating device.

A heating device 11 illustrated in FIG. 3 is mounted in the electric vehicle. The heating device 11 has a controller 11a, and the controller 11a stores heat for heating and performs heating at a predetermined time with respect to the time at which an occupant gets on board. Although the time at which this heating is started can be set to either when the occupant gets on board the vehicle or a predetermined time before the occupant gets on board the vehicle, the present example will describe heating started at a predetermined time before the occupant gets on board the vehicle. In the following description, heating the vehicle cabin in advance before the occupant gets on board the vehicle is referred to as "preheating".

The controller 11a mainly includes a known microcomputer having a known CPU, ROM, RAM, nonvolatile memory, or the like, and the ROM stores various programs executed by the CPU, various kinds of fixed data, and so on. The CPU performs heat storage for heating and heating control in accordance with a program stored in the ROM.

A heat recovery unit 12 is connected to the input side of the controller 11a for recovering thermal energy. The heat recovery unit 12 recovers heat generated by a heat generating source 13 by converting the heat into electrical energy. As for a heat generating source 13, there are heat sources generated by the behavior of the electric vehicle and natural heat sources. Examples of heat generating sources 13 based on the behavior of the electric vehicle include heat generated in an electric vehicle from tire friction while traveling, vibrational heat of a frame, a mount, a suspension, and the like, and frictional heat due to air resistance, and so on. Solar heat, wind power, and the like are natural heat sources that can be used as a heat generating source 13. The electrical energy collected by the heat recovery unit 12 is transmitted to the controller 11a.

Further, a receiver 14 is connected to the input side of the controller 11a. The receiver 14 receives a signal from a transmitter 15 carried by an operator, who is a driver or the like, and the operator wirelessly transmits a heating signal from a remote location to the receiver 14 by turning on a heating switch (not shown) provided on the transmitter 15. When the receiver 14 receives the heating signal, the controller 11a executes a heating control operation in accordance with a control program stored in advance by using the heating signal as a trigger.

Further, an electric heater 21, such as a PTC heater which generates heat by resistance heating, is connected to the output side of the controller 11a, is disposed in the heat storage container 2a described above, and is capable of heating the heat storage material 2e.

A temperature sensor 16 for detecting the temperature of the heat storage material 2e is disposed in the heat storage container 2a, and the temperature sensor 16 is connected to the input side of the controller 11a.

Further, the above-described shutter actuator 22 is connected to the output side of the controller 11a, and an air conditioner 23 is also connected thereto. The air conditioner 23 is of a heat-pump type and heats the entire cabin of the vehicle, and upon receiving an ON signal from the controller 11a, performs air-conditioning heating after heating is completed or activated together with heating.

Figure 4:
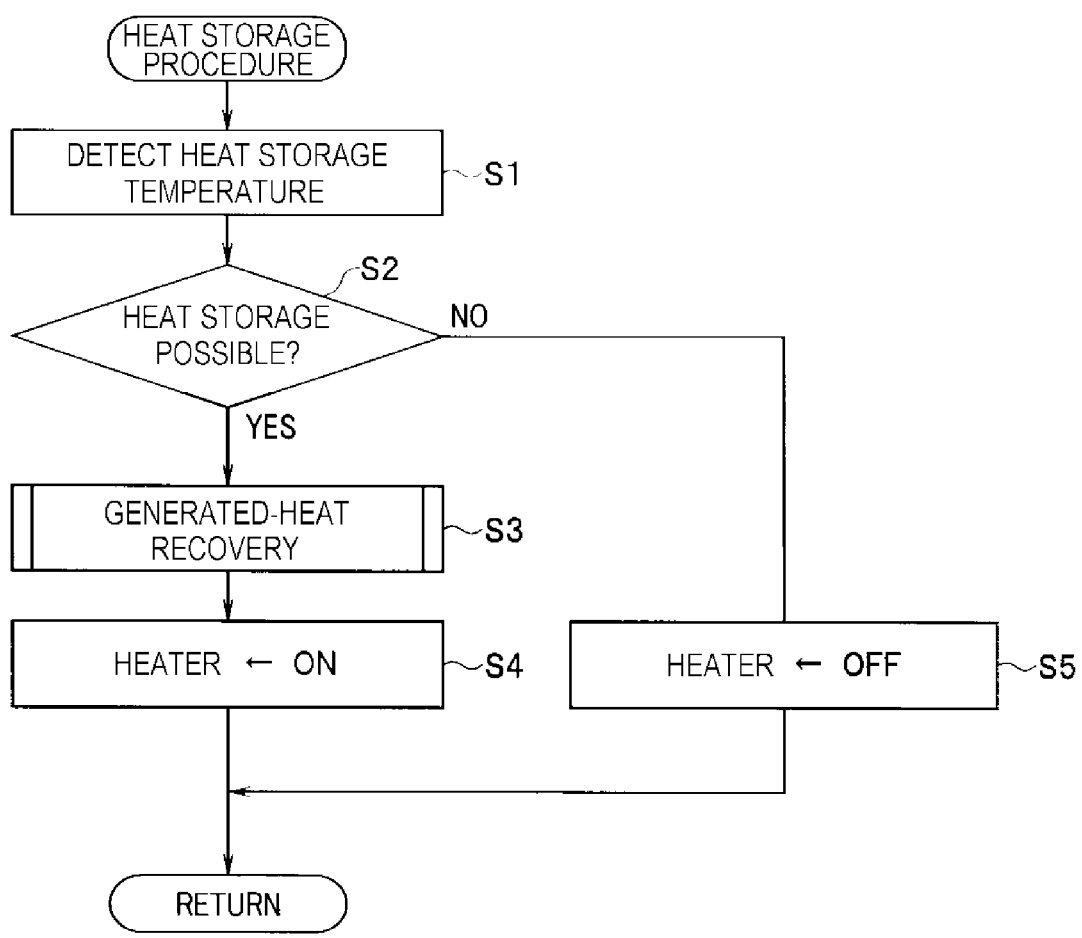
FIG. 4 is a flowchart showing a heat storage procedure.

The controller 11a heats the heat storage material 2e by generating heat from the electric heater 21 with electrical energy from the heat generating source 13 collected by the heat recovery unit 12 while the electric vehicle is running. Heat of the heat storage material 2e is then used to preheat the Ottoman 1b before the occupant gets on board the electric vehicle. Specifically, a heat storage procedure and a preheating procedure performed by the controller 11a are performed according to a heat storage procedure and a heating procedure illustrated in FIGS. 4 and 5. The process executed in the heat storage procedure of FIG. 4 corresponds to a heat controller of the present invention.

First, the heat storage procedure will be described. As described above, when the electric vehicle runs, the heat recovery unit 12 converts heat from the heat generating source 13 into electrical energy. The controller 11a heats the heat storage material 2e by making the electric heater 21 generate heat with the electrical energy.

In the heat storage procedure, first, in step S1, the temperature (i.e., the heat storage temperature) of the heat storage material 2e detected by the temperature sensor 16 is read, and in step S2, it is determined whether the heat storage material 2e can store heat, in other words, whether the heat storage material 2e has a margin in its heat storage capacity based on a predetermined threshold value. The threshold value may be equal to or lower than the saturation temperature (i.e., the boiling point) of the heat storage material 2e, and is appropriately set according to rising surface temperature characteristics of the Ottoman 1b, and so on. When the heat storage temperature is equal to or lower than the threshold value, it is determined that heat storage is possible and the routine proceeds to step S3. When the heat storage temperature exceeds the threshold value, it is determined that heat storage is not possible and the routine branches off to step S5.

When the procedure proceeds to step S3, a heat recovery process is executed and the procedure proceeds to step S4. The heat recovery process includes a process of adjusting the electrical energy collected by the heat recovery unit 12 to a voltage at which the electric heater 21 can generate heat via a circuit such as a DC/DC converter.

The routine then proceeds to step S4 where the electric heater 21 is made to generate heat with the adjusted voltage and the routine is exited. On the other hand, if the routine branches off to step S5, the electric heater 21 is turned off and the routine is exited. Since the periphery of the heat storage material 2e is covered with the heat insulating material 2b and the heat radiation window 2c opened in the heat insulating material 2b is closed by the heat shutter 2d made of a material having a low thermal conductivity, heat is not easily dissipated and is stored for a long time.

Figure 5:
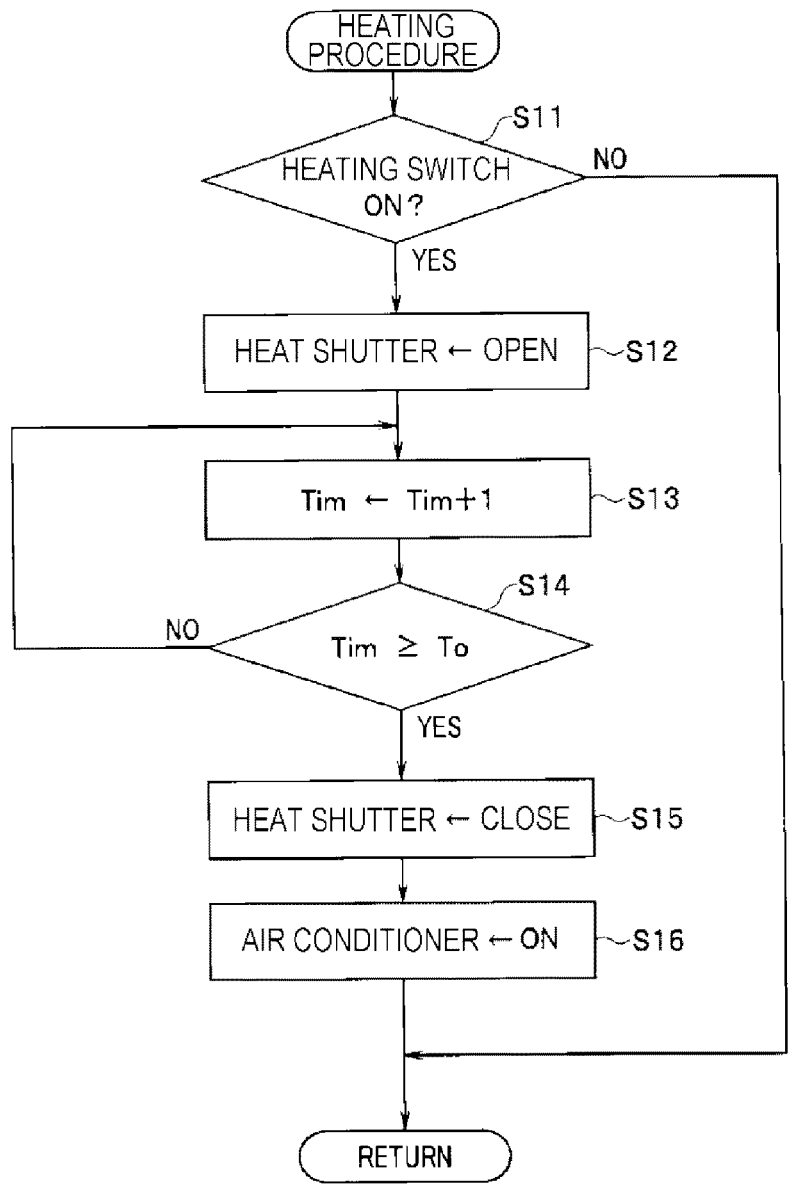
FIG. 5 is a flowchart showing a heating procedure.

The heating procedure shown in FIG. 5, on the other hand, waits until the ON signal of the heating switch is received from the transmitter 15. When the ON signal of the heating switch is detected, the routine proceeds from step S11 to step S12. The transmitter 15 remotely controls preheating by turning on when a driver (i.e., an occupant) gets on board the electric vehicle in a parked state. The transmitter 15 may be a high-performance mobile phone (i.e., a smart phone) or a personal computer, in which case the receiver 14 receives the ON signal over an internet line.

In step S12, the controller 11a turns on the shutter actuator 22. As illustrated in FIG. 2, the shutter actuator 22 is connected to the heat shutter 2d, and when the shutter actuator 22 is turned on, the heat shutter 2d is opened. As a result, the heat stored in the heat storage material 2e is transferred to the Ottoman 1b via the heat radiation window 2c opened in the heat insulating material 2b surrounding the heat storage material 2e, and the upper surface of the Ottoman 1b is heated.

Thereafter, the routine proceeds to step S13, in which the count value Tim of a counter timer is incremented to start measuring the elapsed time, and the routine proceeds to step S14, in which it is checked whether the count value Tim reaches a set time, namely, an expected boarding time To. The expected boarding time To is the expected boarding time of the driver (i.e., the occupant) and can be registered in advance by the driver (i.e., the occupant). The expected boarding time To can be changed as appropriate. The initial value of the count value Tim of the timer is 0.

When Tim<To, the routine returns to step 13 and waits until the expected boarding time To is reached. On the other hand, when the count value (i.e., the elapsed time) Tim has reached the expected boarding time To (Tim≥To), the routine proceeds to step S15 and the shutter actuator 22 is turned off. The heat shutter 2d connected to the shutter actuator 22 is then closed, the heat radiation window 2c is shielded, heating of the Ottoman 1b is stopped, and preheating is completed. Next, the process of the controller 11a proceeds to step S16 where the air conditioner 23 is turned on to have air-conditioning heating take over heating, and then the procedure is ended.

Figure 6:
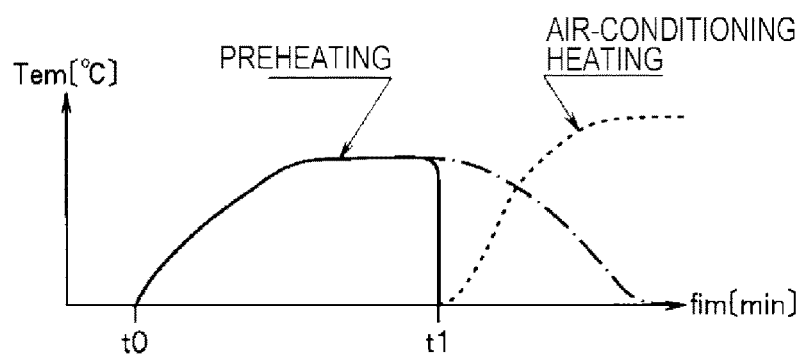
FIG. 6 is a timing chart showing the timing of switching between heating by the heat storage unit and an air conditioner.

FIG. 6 illustrates operation timing of preheating and air-conditioning heating. When the driver (i.e., the occupant) turns on the heating switch (not shown) of the transmitter 15 (i.e., the elapsed time To), the heat shutter 2d is opened, and heat of the heat storage material 2e is radiated. Then, the surface temperature Tem of the Ottoman 1b gradually rises and becomes constant when it reaches a holding temperature of the heat storage material 2e.

When the predetermined expected boarding time To (i.e., elapsed time t1) is reached, the shutter actuator 22 turns off, which causes the heat shutter 2d to block the heat radiation window 2c. Then, as illustrated by the solid line in FIG. 6, heat transfer from the heat storage material 2e is abruptly decreased but the surface temperature Tem of the Ottoman 1b gradually decreases as surplus heat (i.e., residual heat) dissipates, as shown by the dashed-dotted line. At the same time, when the expected boarding time (i.e., elapsed time t1) is reached, the air-conditioning heating is started as indicated by the broken line and the cabin temperature is gradually increased.

For instance, when a driver (i.e., an occupant) attempts to board the vehicle when the external temperature is low, even if at least the upper body is kept warm by dressing warmly, the lower leg has more areas exposed to the outside air than the upper body and, therefore, has a tendency to get cold. When the driver (i.e., an occupant) places a lower leg on the Ottoman 1b when riding the electric vehicle, the lower leg is heated by the surface temperature of the Ottoman 1b. Since the lower leg is exposed to the outside air in many areas, as described above, the lower leg is instead heated quickly and, moreover, warming of the lower leg is quick and efficient due to the close proximity of the lower leg to the Ottoman 1b. As a result, even in a cold condition, the driver (i.e., the occupant) can quickly obtain a feeling of warmth with a small amount of electric power.

Further, since the heat generating source 13 is heat generated during driving, heat from vibrational energy, or heat from a natural source, no external power supply is required and unnecessary increases in electricity costs can be suppressed.

The present invention is not limited to the above-described example, and in steps S13 and S14, for instance, heating may be continued until the surface temperature Tem of the Ottoman 1b reaches a predetermined threshold temperature. In this case, the threshold temperature may be variably set based on the indoor temperature and the body temperature of the driver (i.e., the occupant) at the time of contact with the Ottoman 1b. Further, the heat radiation window 2c may be filled with a material that has a high thermal conductivity.

Further, in step S15, the heat shutter 2d that blocks heat flow may be configured such that blocking is performed in a stepwise manner by duty control or the like by the shutter actuator 22.

Further, in step S16 described above, when the driver (i.e., the occupant) gets on board the vehicle, the cabin temperature may be increased to some extent by setting the timing, at which the air conditioner is turned on, to the time prior to the predetermined time at which the elapsed time Tim reaches the expected boarding time To.

The present invention can also be applied to a case where heating is started at the time at which an occupant gets on board the vehicle. In this case, a door-unlocking signal from a keyless switch, a signal concerning a door-lock switch with which the occupant operates the door knob to unlock the door, a signal concerning a door switch that detects an open door, or a nearby signal from a smart key can be used as an ON signal for the heating switch of step s11.

The invention claimed is:

1. A vehicle heating device comprising: a heat recovery unit configured to convert, into electrical energy, heat generated by at least one of heat sources generated by a behavior of a vehicle or a natural heat source from outside of the vehicle; a heat storage unit configured to be filled with a heat storage material, the heat storage unit in its entirety being enclosed by a heat insulating material, the heat storage unit configured to store thermal energy converted from the electrical energy, a heat radiation window with a heat shutter being formed on a periphery of the heat storage unit, the heat shutter configured to be openable; a footrest configured to be provided at a front portion of a vehicle seat disposed in a vehicle cabin, the footrest including the heat storage unit, and a heat controller configured to store thermal energy in the heat storage unit by using a heater converting the electrical energy into the thermal energy when the vehicle traveling is detected, the heater provided inside the heat storage unit, and turn on an aft conditioner of the vehicle with the heat shutter closed after warming the footrest by opening the heat shutter to transfer the thermal energy through the heat shutter from inside the heat storage unit into the footrest at a predetermined timing with respect to an occupant being in the vehicle.

2. The vehicle heating device according to claim 1, wherein the heat controller radiates heat from the heat storage material that heats the footrest at the predetermined timing before the occupant gets in the vehicle.

3. The vehicle heating device according to claim 1, wherein
a heat transfer area is provided to the heat insulating material interposed between an upper surface of the heat storage material and the upper surface of the footrest, the heat transfer area being configured to transfer heat between the heat storage material and an upper surface of the footrest, wherein
the heat transfer area is provided with a heat transfer opening and closing unit configured to open and close the heat transfer area, and
the opening and closing of the heat transfer area is controlled by the heat controller.

4. The vehicle heating device according to claim 2, wherein
a heat transfer area is provided to the heat insulating material interposed between an upper surface of the heat storage material and the upper surface of the footrest, the heat transfer area being configured to transfer heat between the heat storage material and an upper surface of the footrest, wherein
the heat transfer area is provided with a heat transfer opening and closing unit configured to open and close the heat transfer area, and
the opening and closing of the heat transfer area is controlled by the heat controller.

5. The vehicle heating device according to claim 3, wherein the heat controller operates the heat transfer opening and closing unit to open the heat transfer area upon receiving from outside a signal indicating an intention of the occupant to board.

6. The vehicle heating device according to claim 4, wherein the heat controller operates the heat transfer opening and closing unit to open the heat transfer area upon receiving from outside a signal indicating an intention of the occupant to board.

7. The vehicle heating device according to claim 5, wherein, after the heat transfer area is opened by the heat transfer opening and closing unit, the heat controller closes the heat transfer area with the heat transfer opening and closing unit when the upper surface temperature of the footrest exceeds a predetermined threshold temperature.

8. The vehicle heating device according to claim 6, wherein, after the heat transfer area is opened by the heat transfer opening and closing unit, the heat controller closes the heat transfer area with the heat transfer opening and closing unit when the upper surface temperature of the footrest exceeds a predetermined threshold temperature.

9. The vehicle heating device according to claim 7, wherein, after transmitting a start signal to the air conditioner, the heat controller closes the heat transfer area, or closes the heat transfer area stepwise, with the heat transfer opening and closing unit.

10. The vehicle heating device according to claim 8, wherein, after transmitting the start signal to the air conditioner, the heat controller closes the heat transfer area, or closes the heat transfer area stepwise, with the heat transfer opening and closing unit.

11. The vehicle heating device according to claim 7, wherein the threshold temperature set in the heat controller is variably set on a basis of cabin temperature of the vehicle and the occupant's body temperature at a time of contact by the occupant.

12. The vehicle heating device according to claim 8, wherein the threshold temperature set in the heat controller is variably set on a basis of cabin temperature of the vehicle and the occupant's body temperature at a time of contact by the occupant.

13. The vehicle heating device according to claim 9, wherein the threshold temperature set in the heat controller is variably set on a basis of cabin temperature of the vehicle and the occupant's body temperature at a time of contact by the occupant.

14. The vehicle heating device according to claim 10, wherein the threshold temperature set in the heat controller is variably set on a basis of cabin temperature of the vehicle and the occupant's body temperature at a time of contact by the occupant.

15. The vehicle heating device according to claim 7, wherein the predetermined threshold temperature of the heat controller is a variable value which is manually adjusted in advance.

16. The vehicle heating device according to claim 8, wherein the predetermined threshold temperature of the heat controller is a variable value which is manually adjusted in advance.

17. The vehicle heating device according to claim 9, wherein the predetermined threshold temperature of the heat controller is a variable value which is manually adjusted in advance.

18. The vehicle heating device according to claim 10, wherein the predetermined threshold temperature of the heat controller is a variable value which is manually adjusted in advance.

19. A vehicle heating device comprising: a heat recovery unit configured to convert, into electrical energy, heat generated by at least one of a-heat sources generated by a behavior of a vehicle or a natural heat source from outside of the vehicle; a heat storage unit configured to be filled with a heat storage material, the heat storage unit in its entirety being enclosed, by a heat insulating material, the heat storage unit configured to store thermal energy converted from the electrical energy, a heat radiation window with a heat shutter being formed on a periphery of the heat storage unit, the heat shutter configured to be openable; a footrest configured to be provided at a front portion of a vehicle seat disposed in a vehicle cabin, the footrest including the heat storage unit, and circuitry configured to: store thermal energy in the heat storage unit by using a heater converting the electrical energy into the thermal energy when the vehicle traveling is detected, the heater provided inside the heat storage unit, and turn on an air conditioner of the vehicle with the heat shutter closed after warming the footrest by opening the heat shutter to transfer the thermal energy through the heat shutter from inside the heat storage unit into the footrest at a predetermined timing with respect to an occupant being in the vehicle.

* * * * *